(12) United States Patent
McCullagh

(10) Patent No.: US 10,659,098 B2
(45) Date of Patent: May 19, 2020

(54) DUPLEXING APPARATUS, TRANSCEIVER APPARATUS AND METHOD OF COMPENSATING FOR SIGNAL LEAKAGE

(71) Applicant: u-blox AG, Thalwil (CH)

(72) Inventor: Michael Joseph McCullagh, Cork (IE)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 16/303,314

(22) PCT Filed: May 20, 2016

(86) PCT No.: PCT/EP2016/061457
§ 371 (c)(1),
(2) Date: Nov. 20, 2018

(87) PCT Pub. No.: WO2017/198315
PCT Pub. Date: Nov. 23, 2017

(65) Prior Publication Data
US 2019/0215028 A1    Jul. 11, 2019

(51) Int. Cl.
*H04B 1/52* (2015.01)
*H04B 1/525* (2015.01)
(Continued)

(52) U.S. Cl.
CPC ......... *H04B 1/525* (2013.01); *H04B 1/0057* (2013.01); *H04B 1/44* (2013.01); *H04L 5/1423* (2013.01)

(58) Field of Classification Search
CPC ........ H04B 1/525; H04B 1/44; H04B 1/0057; H04L 5/1423
See application file for complete search history.

(56) References Cited

U.S. PATENT DOCUMENTS

2003/0214958 A1* 11/2003 Madour ................. H04L 12/14
                                                              370/401
2005/0113052 A1*  5/2005 Rabinovich ............. H03F 1/32
                                                              455/194.2
(Continued)

OTHER PUBLICATIONS

International Search Report and Written Opinion dated Feb. 9, 2017, in International Application No. PCT/EP2016/061457 (12 pgs.).
(Continued)

*Primary Examiner* — Wei Zhao
(74) *Attorney, Agent, or Firm* — Finnegan, Henderson, Farabow, Garrett & Dunner LLP

(57) ABSTRACT

A duplexing apparatus comprises a hybrid junction module having an antenna port, a transmit port, a receive port and a balance port. The apparatus also comprises a feedforward circuit arranged to be responsive in respect of a first transmit band of frequencies and a second transmit band of frequencies, the feedforward circuit having an input operably coupled to the transmit port of the hybrid junction module and an output. The hybrid junction is arranged to isolate substantially the receive port from the transmit port in respect of the first transmit band of frequencies and substantially not to isolate the receive port from the transmit port in respect of the second transmit band of frequencies. The feedforward circuit is also arranged to favour propagation therethrough of signal frequencies in the second transmit band over signal frequencies in the first transmit band, thereby rendering a compensation signal at the output.

24 Claims, 4 Drawing Sheets

(51) Int. Cl.
*H04B 1/00* (2006.01)
*H04B 1/44* (2006.01)
*H04L 5/14* (2006.01)

(56) References Cited

U.S. PATENT DOCUMENTS

2014/0194071 A1   7/2014  Wyville
2016/0127111 A1   5/2016  Chang et al.
2017/0187414 A1*  6/2017  Talty .................. H04B 1/1036

OTHER PUBLICATIONS

Asbeck et al., "Adaptive Duplexer Implemented Using Single-Path and Multipath Feedforeward Techniques with BST Phase Shifters", IEEE Transactions on Microwave Theory and Techniques, IEEE Service Center, Piscataway, NJ, US, vol. 53, No. 1, Jan. 1, 2005, pp. 106-114.

* cited by examiner

DUPLEXING APPARATUS, TRANSCEIVER APPARATUS AND METHOD OF COMPENSATING FOR SIGNAL LEAKAGE

CLAIM FOR PRIORITY

This application is a U.S. national phase entry under 35 U.S.C. § 371 from PCT International Application No. PCT/EP2016/061457, filed May 20, 2016, which this application claims priority and is incorporated herein by reference.

FIELD OF THE INVENTION

The present invention relates to a duplexing apparatus of the type that, for example, comprises a hybrid junction module. The present invention also relates to a transceiver apparatus of the type that, for example, comprises a duplexing apparatus. The present invention further relates to a method of compensating for signal leakage, the method being of the type that, for example, compensates for signal leakage from a transmit port of a hybrid junction module to a receive port thereof.

BACKGROUND OF THE INVENTION

In a wireless communications system, such systems comprise a network infrastructure and user equipment, which can for example be portable communications devices. Such communications devices typically receive and transmit signals through the same antenna or antennas. This means that some form of duplexing scheme is required in order to allow the device to separate the incoming and outgoing signals such that the former is not swamped by the latter. In this respect, Time-Division Duplexing (TDD) and Frequency-Division Duplexing (FDD) are both well-known duplexing schemes.

So-called 4G, or Long Term Evolution (LTE), is the successor to existing 2G and 3G communications systems. Both TDD and FDD variants of LTE-compliant networks are already in operation in many countries. In relation to radio spectrum availability, for historical reasons, there are 38 LTE operating frequency bands for the LTE standard as defined in the 3G Partnership Project (3GPP) Rel 11 of the LTE standard, of which 26 require FDD operation.

In FDD radio operation, there are two separate carriers at different frequencies, one for the uplink transmission and one for the downlink transmission. Isolation between the downlink and the uplink transmissions is usually achieved by transmission/reception filters called diplexing filters (duplexers or diplexers). These filters are typically implemented as two highly selective filters, one centred on a receive frequency band, the other centred on the transmit frequency band to separate the transmit signals from the receive signals and so prevent the transmit signals from interfering with the receive signals. Acoustic resonator filters, such as Surface Acoustic Wave (SAW) filters, are typically used to provide the low insertion loss and sharp roll-off required of duplexing filters. Although these are individually small and cheap, a communications device that is to support multiple frequency bands requires one duplexing filter per frequency band to be supported and further Radio Frequency (RF) switching for selection between the frequency bands so that the duplexing filters can share the antenna.

Furthermore, these filters cannot be integrated with a CMOS circuit owing to the high-Q resonators used to build SAW filters that require a separate material and manufacturing process and so they must be implemented off-chip. This is not usually problematic for a simple radio transceiver operating on a single frequency band. However, modern radio transceivers are usually multi-band. As mentioned above, the LTE standard currently specifies 26 FDD frequency bands. To support all of the specified frequency bands would require a manufacturer of user equipment to use multiple filters due to the need for one duplexing filter per frequency band supported. A bank of discrete duplexers is one known approach to providing the switching for selection mentioned above, the bank being connected to an antenna, transmitter and receiver via a multi-way RF switch, which selects the appropriate duplexer based upon a required frequency band of operation. Such an approach increases the complexity of the user equipment, as well as increasing the overall size and cost of the multi-band transceiver. This approach can also lead to performance penalties; for example, the introduction of the RF switch results in signal power losses as multiple frequency bands are supported.

Many device manufacturers simply circumvent this problem by designing and manufacturing differently configured devices supporting different sets of frequency bands of operation. Manufacturers thus provide a range of devices each of which is operable in different groups of territories with different frequency band combinations. It can therefore be appreciated that obviating the need for the above-described filters would remove a barrier to the manufacture of a "world phone", the benefits of which would provide economies of scale to the mobile telephony industry, and mitigate an inconvenience for the international traveller.

Therefore, there is a significant market demand for a solution that is able to replace the fixed tuned duplexing filters with a flexible device that can support multiple, preferably all, frequency bands.

Although it is possible to tune duplexer filters making up a duplexer dynamically, such an approach is currently technically impractical because very high Q-factor resonators are required to achieve the desired selectivity and low power loss. Currently, in order to achieve the small filter size required, such resonators are only realisable as acoustic resonators, which have a well-known bi-resonant characteristic that limits their electrical tuning to only a small frequency range.

An alternative duplexing solution is the use of Electrical Balance Isolation (EBI) duplexers or so-called hybrid junction or hybrid circuits. This is a 4-port network that can separate the forward and reverse wave directions in a transmission line. Hybrid junctions can be made in a number of ways, including using transformers, waveguides ("magic tees"), or microstrips ("directional couplers"). Hybrid junctions can also be made using active circuits, as is the case for modern electronic analogue wireline phones.

The hybrid junction typically comprises a first (transmit) port, a second (antenna) port, a third (receive) port and a fourth (balance) port. In operation of an ideal hybrid junction where all ports are terminated with matched impedance loads, all power incident at the transmit port is divided between the antenna port and the balance port while zero power appears at the receive port. Likewise, all power incident at the antenna port is divided between the receive port and the transmit port, while zero power appears at the balance port. This manner of operation corresponds to the ideal hybrid junction exhibiting a 3 dB or half power coupling loss when in a transmit mode and in a receive mode.

Broadband hybrids can be made using transformers, and single-transformer circuits, for example as described in "A Multiband RF Antenna Duplexer on CMOS: Design and Performance" (M. Mikhemar, H. Darabi, and A. A. Abidi, IEEE Journal of Solid-State Circuits, vol. 48, pp. 2067-2077, 2013).

A theoretical hybrid junction with balancing network, when used as a duplexer, has a power amplifier of a transceiver transmitter chain coupled to the transmit port thereof and a low-noise amplifier of a transceiver receiver chain coupled to the receive port thereof. Transmit power applied at the transmit port by the power amplifier is, as described above, divided between the antenna port and the balance port and the low-noise amplifier is isolated, i.e. there is no leakage of a transmit signal into the receiver chain as long as the reflection coefficients at the antenna port and the balance port are identical in magnitude and phase, the reflection coefficients being dependent upon the impedance coupled to the antenna port and the impedance coupled to the balance port, respectively.

In practice, however, use of the hybrid junction with balancing network as a duplexer suffers from a number of drawbacks. Firstly, the impedance of the antenna, and so by extension the impedance at the antenna port, typically exhibits variation in both the time domain and frequency domain. The impedance of the antenna can vary with time, for example owing to objects moving in the proximity of the antenna, and consequently, it is necessary to adapt dynamically the impedance at the balance port to the impedance at the antenna port to account for these changes. The antenna impedance also typically varies with frequency and so, to obtain balance at the particular frequency of interest, the impedance at the balance port must be adapted accordingly, and a good balance may not be achievable over a sufficiently wide system bandwidth, for example the 20 MHz needed for an LTE channel.

Secondly, other coupling mechanisms cause leakage of some of the transmit signal from the transmit port to the receive port of the hybrid junction. As such, isolation of the receive port from the transmit port is limited.

Despite the above-mentioned drawbacks associated with use of the hybrid junction as a duplexer, attempts have been made to obviate or at least mitigate the above disadvantages. For example, "Optimum Single Antenna Full Duplex Using Hybrid Junctions" (Laughlin, Beach, Morris and Haine, IEEE Journal of Selected Areas In Communications, Vol. 32, No. 9, September 2014, pages 1653 to 1661), considers an arbitrary antenna with an impedance that can vary widely with frequency and with a return loss that is likely to be of the order of 10 dB minimum (as long as there are no de-tuning proximity effects). This is a practical reality for a transceiver circuit that can be built into a wide range of end products and could possibly be connected through an unknown length of transmission line. So-called Electrical Balance (EB) of the hybrid junction is proposed in the above-referenced document. This is one of a number of solutions that have been proposed in order to isolate the transmit port of the hybrid junction from the receive port.

Although advances have been made in hybrid junction duplexing design to minimise leakage of in-band transmit signals from the transmit port to the receive port, technical challenges nevertheless exist. For example, components of noise generated by transmit chain circuitry but residing in the receive band of frequencies, for example by a synthesiser and/or a power amplifier, are still known to leak from the transmit port to the receive port of the hybrid junction and so are present in the receive band of receive chain circuitry of a transceiver.

US patent publication no. 2007/0264943 is directed to a different approach with the objective of avoiding the need of an external SAW filter. Indeed, this document does not assume the need for a hybrid junction, rather it relates to an alternative to using the SAW filter. In this respect, the document relates to a method and apparatus to filter a so-called blocker signal frequency component from a signal comprising desired signal frequency components and the blocker signal frequency components. The solutions proposed comprise a filter arrangement applied across a Low-Noise Amplifier (LNA) of a receiver circuit. The circuit shunts a portion of the signal as applied to an input of the LNA and the filter arrangement removes the blocker signal frequency components from the shunt signal before combining the filtered shunt signal with an amplified signal output by the LNA. The combination results in the subtraction of the filtered shunt signal containing the blocker signal frequency components from the amplified signal output by the LNA, which comprises amplified blocker signal frequency components and desired signal frequency components, to leave the amplified desired signal frequency components for further processing by the receiver circuit. However, the "SAWless receiver" relies on the blocker signal frequency components and the desired signal frequency components being in different frequency bands, which differs from the challenges faced in relation to the leakage to the receive port of the hybrid junction of components of noise generated in the receive band of frequencies by the transmit chain circuitry that then appear along with the frequency components of interest in the receive band. In this respect, this is analogous to the blocker signal of US patent publication no. 2007/0264943 being in the same band of frequencies as the desired signal. Furthermore, the filter arrangement is applied across the LNA and attempts to filter out frequency components that would already be removed by the hybrid junction with balancing network were it to be employed.

BRIEF SUMMARY OF THE INVENTION

According to a first aspect of the present invention, there is provided a duplexing apparatus comprising: a hybrid junction module having an antenna port, a transmit port, a receive port and a balance port; a feedforward circuit arranged to be responsive in respect of a first transmit band of frequencies and a second transmit band of frequencies, the feedforward circuit having an input operably coupled to the transmit port of the hybrid junction module and an output; wherein the hybrid junction module is arranged to isolate substantially the receive port from the transmit port in respect of the first transmit band of frequencies and substantially not to isolate the receive port from the transmit port in respect of the second transmit band of frequencies; and the feedforward circuit is arranged to favour propagation therethrough of signal frequencies in the second transmit band over signal frequencies in the first transmit band, thereby rendering a compensation signal at the output.

The apparatus may further comprise a signal isolation control circuit operably coupled to the balance port.

The feedforward circuit may comprise a filter arrangement providing Radio Frequency filtering over the transmit bands of frequencies. The filter may be a translational filter providing Radio Frequency notch filtering.

The feedforward circuit may comprise a down-converter for down-converting from radio frequency to baseband frequency.

The translational filter may comprise the down-converter. The translational filter may further comprise: a first high-pass filter. The first high-pass filter may be passive.

The feedforward circuit may further comprise: a second high-pass filter operably coupled to the first high-pass filter. The second high-pass filter may be active.

The feedforward circuit may further comprise: a programmable gain circuit operably coupled to the second high-pass filter.

The feedforward circuit may further comprise: a programmable phase circuit operably coupled to the second high-pass filter.

The feedforward circuit may further comprise: an up-converter operably coupled to the programmable gain circuit or the programmable phase circuit.

The apparatus may further comprise a directional coupler arranged to operably couple the input of the feedforward circuit to the transmit port.

The down-converter may have a local oscillator input; the down-converter may be arranged to be responsive to a transmit local oscillator signal applied to the local oscillator input.

The up-converter may have a local oscillator input; the up-converter may be arranged to be responsive to a transmit local oscillator signal applied to the local oscillator input.

The apparatus may further comprise a signal combiner operably coupled to the feedforward circuit and the receive port.

The signal combiner may be a low-noise amplifier.

According to a second aspect of the present invention, there is provided a transceiver apparatus comprising: the signal isolation apparatus as set forth above in relation to the first aspect of the invention; and an amplifier having a first input coupled to the receive port of the hybrid junction module and a cancellation input operably coupled to the output of the feedforward circuit, the amplifier being arranged to apply, when in use, the compensation signal in order to remove signals in the second transmit band of frequencies from a receive band of frequencies associated with the receive port of the hybrid junction module.

The amplifier may be a low noise amplifier.

The apparatus may further comprise: a receive baseband processing unit operably coupled to the programmable gain circuit.

The receive baseband processing unit may be arranged to calculate a gain setting value and communicate the gain setting value to the programmable gain circuit.

The gain setting value may be based upon a calculated indication of signal quality associated with a received signal.

The calculated indication of signal quality may be associated with the received signal of the baseband processing unit. The calculated indication of signal quality may be a signal-to-noise ratio.

The apparatus may further comprise: a receive baseband processing unit operably coupled to the programmable phase circuit.

The receive baseband processing unit may be arranged to calculate a phase setting value and communicate the phase setting value to the programmable phase circuit.

The phase setting value may be based upon a calculated indication of signal quality associated with a received signal.

The apparatus may further comprise: a power amplifier having an output operably coupled to the transmit port of the hybrid junction module.

According to a third aspect of the present invention, there is provided a communications apparatus comprising the transceiver apparatus as set forth above in relation to the second aspect of the invention.

The transceiver apparatus may be arranged to operate in accordance with a frequency division duplexing communication scheme.

According to a fourth aspect of the present invention, there is provided a method of compensating for signal leakage from a transmit port of a hybrid junction module to a receive port thereof, the method comprising: receiving a signal at the transmit port, the signal having frequency components in a first transmit band of frequencies and further frequency components in a second transmit band of frequencies; the hybrid junction module isolating substantially the receive port thereof from the transmit port in respect of the first transmit band of frequencies; the hybrid junction module substantially not isolating the receive port from the transmit port in respect of the second transmit band of frequencies; tapping a portion of the signal and feeding forward the further frequency components of the portion of the signal in the second transmit band of frequencies in favour of the frequency components of the portion of the signal in the first transmit band of frequencies; and outputting the portion of the signal that has survived the feeding forward as a compensation signal.

It is thus possible to provide a method and apparatus that effectively compensates for noise signals comprising frequency components in a receive band leaking to the receive port of the hybrid junction from the transmit port of the hybrid junction. In this regard, even though transmit-related noise applied to the transmit port may leak to the receive port of the hybrid junction, the presence of the leaked noise in the receive band of frequencies at the receive port is obviated by removal of the noise, for example downstream of the receive port, such as at the LNA.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
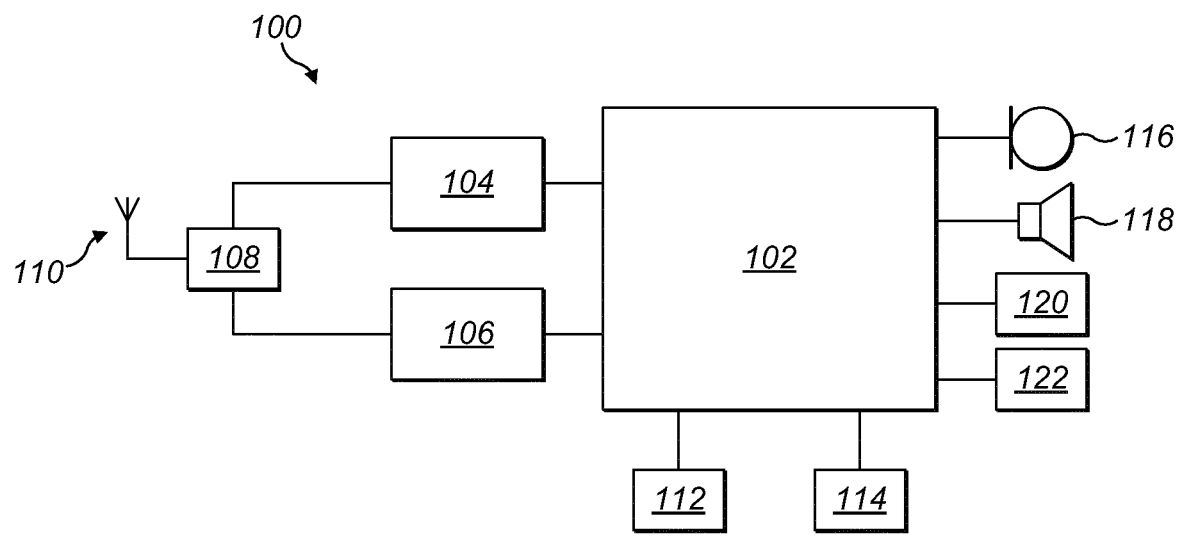
FIG. 1 is a schematic diagram of a user equipment unit constituting an embodiment of the invention.

Throughout the following description identical reference numerals will be used to identify like parts.

Referring to FIG. 1, a user equipment (UE) unit 100 operating in an LTE communications system, comprises a processing resource 102, the processing resource 102 being, in this example, a chipset of a cellular communications terminal. The processing resource 102 is coupled to a transmitter chain 104 and a receiver chain 106, the transmitter and receiver chains 104, 106 being coupled to a duplexing apparatus 108. The duplexing apparatus 108 is coupled to an antenna 110.

The UE unit 100 also possesses a volatile memory, for example a RAM 112, and a non-volatile memory, for example a ROM 114, each coupled to the processing resource 102. The processing resource 102 is also coupled to a microphone 116, a speaker unit 118, a keypad 120 and a display 122. The skilled person should appreciate that the architecture of the UE unit 100 described above comprises other elements, but such additional elements have not been described herein for the sake of preserving conciseness and clarity of description.

Figure 2:
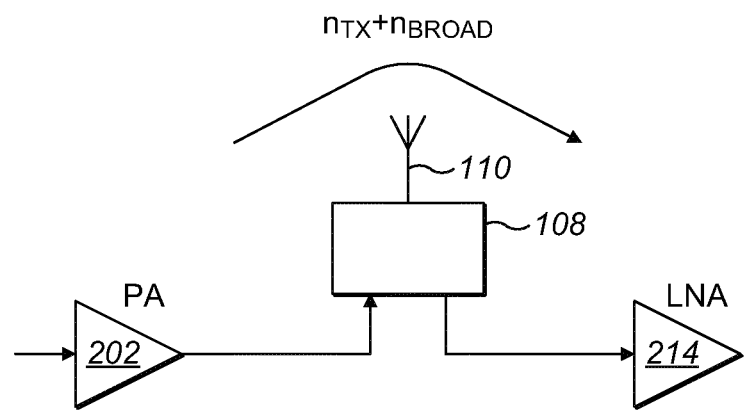
FIG. 2 is a schematic diagram of a partial view of a transceiver apparatus used by the user equipment unit of FIG. 1 and constituting another embodiment of the invention.

Referring to FIG. 2, the transmitter chain 104 comprises, inter alia, a Power Amplifier (PA) 202 operably coupled to an input port or node of the duplexing apparatus 108 and the receiver chain 106 comprises, inter alia, a Low-Noise Amplifier (LNA) 214 operably coupled to an output port or node of the duplexing apparatus 108.

Figure 3:
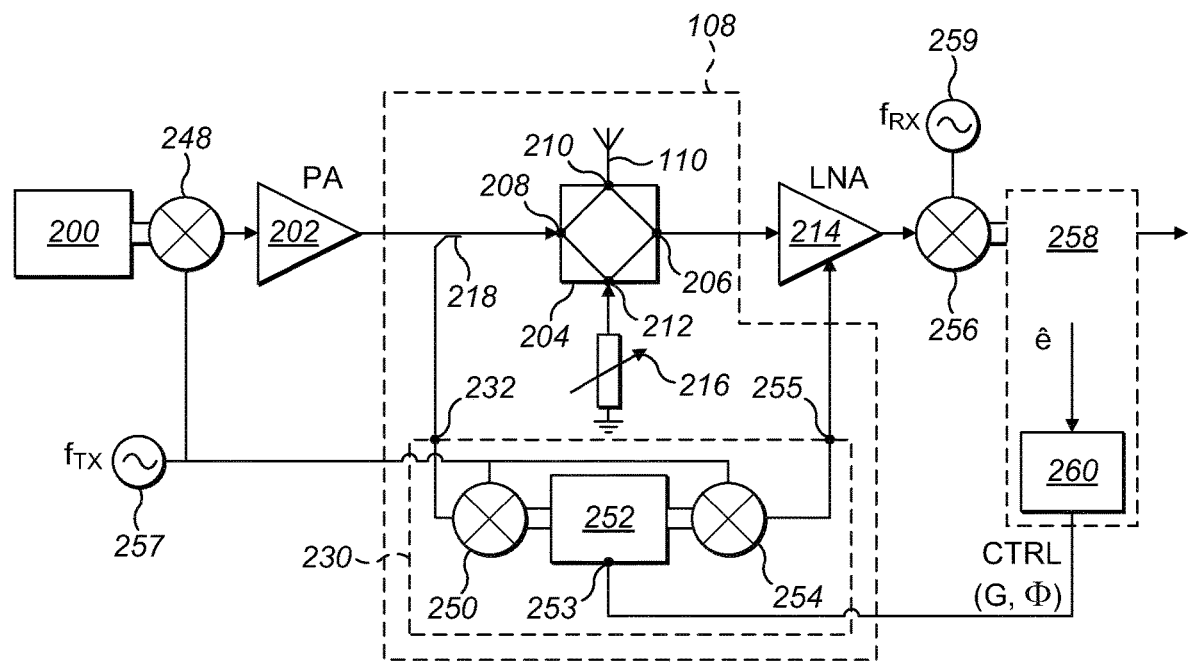
FIG. 3 is a schematic diagram of an expansion of the partial view of the transceiver apparatus of FIG. 2 and showing the partial view of the transceiver apparatus of FIG. 2 in greater detail.

Turning to FIG. 3, in a transceiver comprising the transmitter chain 104 and the receiver chain 106, the transmitter chain 104 of FIG. 1 comprises a transmit modulator 200, a first up-converting mixer, hereinafter referred to as a "first up-converter" 248, and the power amplifier 202. An output of the transmit modulator 200 is operably coupled to an input of the first up-converter 248. An output of the first up-converter 248 is operably coupled to an input of the power amplifier 202. In this example, the output of the transmit modulator 200 is divided into in-phase (I) and quadrature (Q) paths. However, the skilled person will appreciate that in other implementation the format of the signal output by the transmit modulator 200 can be any format appropriate for a desired signal communication scheme being implemented in the transceiver. The power amplifier 202 can therefore comprise different stages, which can be single ended or balanced, depending on the design preferences.

The duplexing apparatus 108 comprises a hybrid junction module 204 having the output node 206, the input node 208, an antenna node or port 210 and a balance node or port 212. Herein, when used with respect to the hybrid junction 204, the terms "input node" and "output node" are expressed from the perspective of the hybrid junction 204 being the point of reference. The receiver chain 106 comprises the LNA 214, a first down-converting mixer, hereinafter referred to as a "first down-converter" 256, a baseband processing unit 258 and subsequent processing stages (not shown). As the components of the remainder of the receiver chain 106 are set out in the LTE standard and would, in any event, be readily understood by the skilled person and have no bearing on the understanding of the inventive concepts expounded in the examples set forth herein, they will not be described in further detail.

As mentioned above, the output node 206, constituting a receive node 206 of the hybrid junction module 204 is coupled to a signal input of the LNA 214. An output of the LNA 214 is operably coupled to an input of the first down-converter 256, an output of the first down-converter 256 being operably coupled to the baseband processing unit 258. Again, in this example, the output of the first down-converter 256 is divided into I and Q paths. However, and as mentioned previously in relation to the first up-converter 248, the skilled person will appreciate that in other imple- mentations the format of the signal output by the first down-converter 256 can differ depending upon implementation requirements.

The hybrid junction module 204 also comprises a signal isolation control circuit 216, depicted as a tuneable impedance for the sake of simplicity and conciseness of description, operably coupled to the balance node 212. However, the skilled person should appreciate that the signal isolation control circuit 216 can be implemented in any of a number of ways, depending upon implementation preferences, and the example of a single adjustable impedance should not be considered as an indication of the limits to implementation possibilities. Indeed, it should also be appreciated that impedance is not necessarily the only parameter that can be adjusted to place the hybrid junction module 204 in a state of balance where the receive port 206 is considered sufficiently isolated from the transmit port 208. For example, the signal isolation control circuit 216 can employ the isolation techniques set forth in International patent application no. PCT/EP2015/052800 and/or European patent publication no. 2 903 170, the contents of which are incorporated herein by reference. The solutions set forth in these documents are examples of ways of controlling the hybrid junction module 204 so as to provide sufficient mitigation of leakage to the receive port 206 of transmit signal frequency components in a first transmit band of frequencies, intended for transmission through the antenna 110, which will be referred herein to as "TX-blocker" signals, $n_{TX}$, which constitutes a form of interference from the perspective of the receive side of the hybrid junction module 204 when leakage thereto in the receive band of the receiver chain 106 occurs. However, noise, $n_{BROAD}$, in a second transmit band of frequencies that are generated in the transmitter chain 104, aspects of the noise will be discussed later herein, is less effectively prevented from leaking from the transmit node 208 to the receive node 206. In order to address this limitation, the duplexing apparatus 108 is supplemented with a feedforward circuit 230. The purpose of the feedforward circuit 230 is to generate a signal from the output of the power amplifier 202 that can be used to cancel the noise signal, $n_{BROAD}$, leaked to the receive port 206 and that is present in the receive band upon entering the LNA 214.

The feedforward circuit 230 comprises an input 232 operably coupled to the output of the power amplifier 202 by a coupler, for example a directional coupler 218. The directional coupler 218 serves as a signal tap. The input 232 of the feedforward circuit 230 is also coupled to an input of a second down-converting mixer, hereinafter referred to as a "second down-converter" 250, outputs of the second down-converter 250 being operably coupled to a signal tuning unit 252 having a control input 253 and outputs that are operably coupled to respective inputs of a second up-converting mixer, hereinafter referred to as a "second up-converter" 254. In this example, an output of the second up-converter 254 is operably coupled to an output 255 of the feedforward circuit 230, the output 255 being operably coupled to a signal cancellation input of the LNA 214. The second down-converter 250 and the second up-converter 254 respectively have local oscillator signal inputs operably coupled to the same transmit local oscillator 257 operating at a transmit mixing frequency, $f_{TX}$, the first up-converter 248 having a local oscillator input also operably coupled to the transmit local oscillator 257. Analogously, the first down-converter 256 has a local oscillator input operably coupled to a receive local oscillator 259 operating at a receive mixing frequency, $f_{RX}$.

The control input 253 is operably coupled to an output of a controller unit 260 of the baseband processing unit 258 for receiving a gain control signal, G, and a phase control signal, φ, the controller unit 260 having an input operably coupled to a source (not shown) within the baseband processing unit 258 that provides a signal providing an indication of received signal quality, which can be an error signal, a signal-to-noise ratio (SNR) or any other appropriate metric capable of use for determining effectiveness of mitigation of the noise signal, $n_{BROAD}$. In this example, an SNR signal is provided by the baseband processing unit 258.

Figure 4:
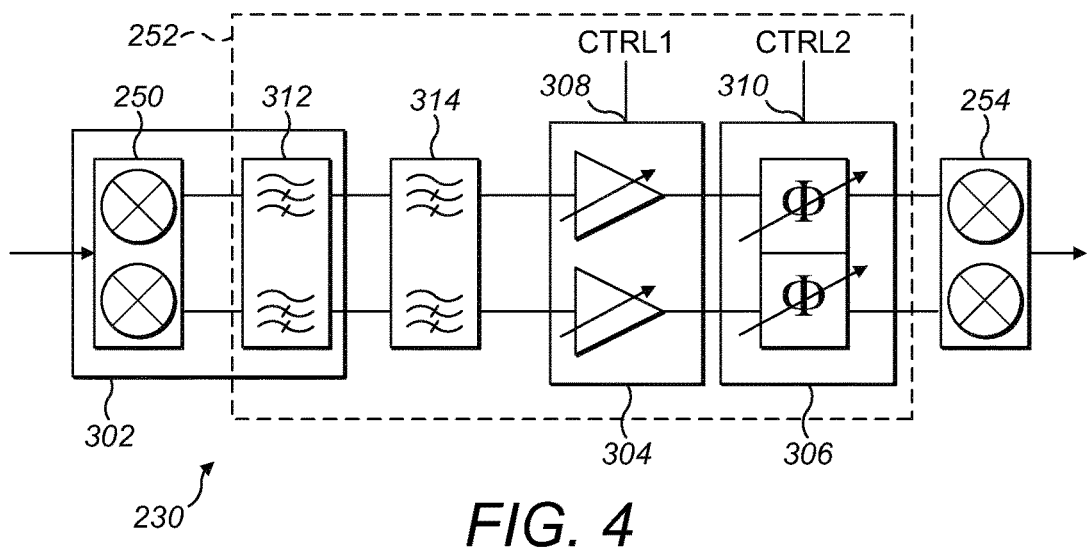
FIG. 4 is a schematic diagram of a feedforward unit of FIG. 3 in greater detail.

Turning to FIG. 4, the signal tuning unit 252 comprises a first high-pass filter 312 having inputs respectively operably coupled to the I and Q outputs of the second down-converter 250. In this example, the first high-pass filter 312 is a passive filter. Together with the second down-converter 250, the first high-pass filter 312 serves as a translational filter, further details of which will be described later herein. However, the skilled person will appreciate that other implementations can be employed as alternatives to the translational filter arrangement described herein.

The I and Q outputs of the first high-pass filter 312 are operably coupled to I and Q inputs of a second high-pass filter 314. In this example, the second high-pass filter 314 is an active filter, having outputs operably coupled to I and Q inputs of an amplifier, for example a programmable gain amplifier circuit 304. The programmable gain amplifier 304 has a gain control input 308 operably coupled to the control input 253 of the signal tuning unit 252. I and Q outputs of the programmable gain amplifier 304 are operably coupled to I and Q inputs of a programmable phase shifter circuit 306, the programmable phase shifter 306 having a phase control input 310 operably coupled to the control input 253 of the signal tuning unit 252. I and Q outputs of the programmable phase shifter 306 are operably coupled to the I and Q inputs of the second up-converter 254.

Figure 5:
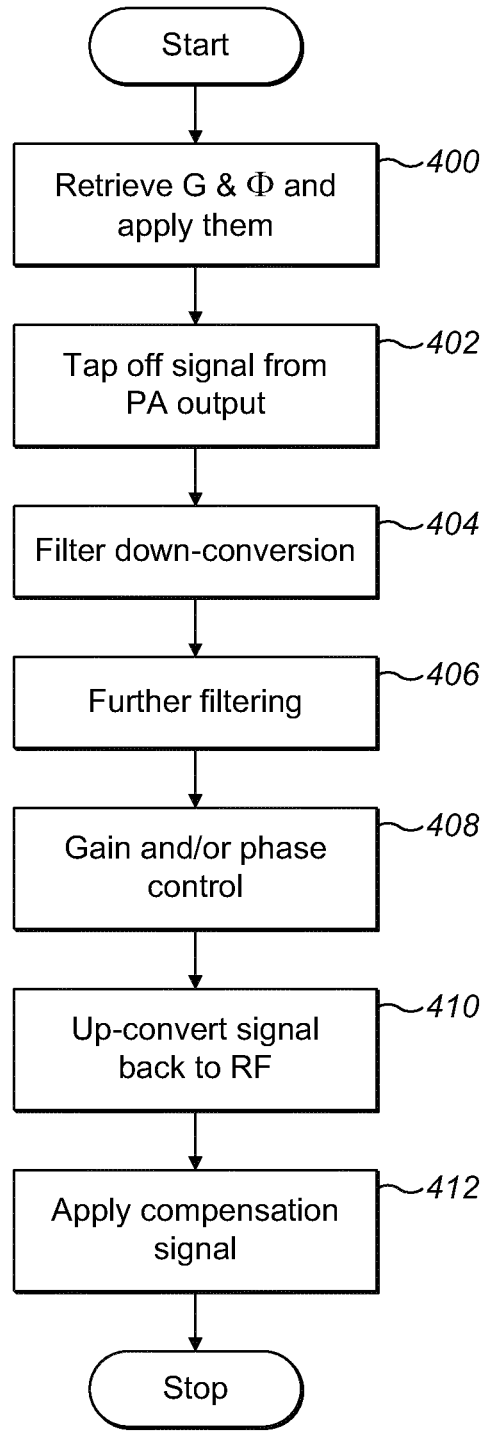
FIG. 5 is a flow diagram of a method of compensating for limited isolation provided by a hybrid junction module of the apparatus of FIG. 3 constituting yet another embodiment of the invention.

In operation (FIG. 5), the signal tuning unit 252 obtains (Step 400) setting values for gain and phase shift from the controller unit 260 and the programmable gain amplifier 304 sets a gain in accordance with the gain setting value obtained and the programmable phase shifter 306 sets a phase shift in accordance with the phase shift setting value obtained. The generation of the gain and phase shift setting values will be described later herein in relation to FIG. 6.

In order to generate a compensation signal to be applied by the LNA 214, a portion of the signal output by the power amplifier 202 is tapped off (Step 402) by the directional coupler 218. In this respect, the signals output by the power amplifier 202 comprise a number of frequency components, for example those of the TX-blocker signals, $n_{TX}$, and the noise, $n_{BROAD}$, generated in the transmitter chain 104, i.e. in the first transmit band of frequencies and the second transmit band of frequencies.

Due to the limitations of the hybrid junction module 204, but typically the ability to tune the signal isolation control circuit 216 so as to match the impedance of the antenna 110 sufficiently accurately, the isolation provided by the hybrid junction module 204 of the receive port 206 from the transmit port 208 is limited. In this respect, the signal isolation control circuit 216 is narrowband in nature and so necessarily dedicated to isolation of the receive port 206 from the TX-blocker signal, i.e. signals in the transmit band. From the perspective of the receive port side of the hybrid junction module 204, the presence of the signal components, $n_{TX}$, in the receive band of frequencies of the receiver chain 106 is undesirable. As a result of the functionality described above, the hybrid junction module 204 performs adequately to minimise leakage of the signal components, $n_{TX}$, in the transmission band of frequencies (the TX-blocker signals) from the transmit port 208 to the receive port 206 to an acceptable level. However, a consequence of the narrowband operation of the signal isolation control circuit 216 is that frequencies outside the narrowband are neglected and so the hybrid junction module 204 is less successful at mitigating leakage from the transmit port 208 to the receive port 206 of the noise, $n_{BROAD}$, generated in the transmitter chain 104, for example as a result of nonlinearities in the transmission path or phase noise in the synthesizer providing the transmit mixing frequency, $f_{TX}$, which result in a broadband signal that can reside in the receive band of the receiver chain 106.

In order to mitigate the effects of the leakage of the noise, $n_{BROAD}$, the portion of the output of the power amplifier 202 is therefore tapped off for processing by the feedforward circuit 230 in cooperation (in this example) with the LNA 214. In this respect, the tapped signal is applied to the inputs of the second down-converter 250, which in addition to mixing the tapped signal down to baseband frequency also performs filtering in RF (Step 404) of the tapped signal. In this regard, the feedforward circuit 230 is responsive to signal frequency components in the first band of frequencies. The combined filtering and down conversion is achieved due to the translational filtering functionality provided by the cooperative operation of the second down-converter 250 with the first high-pass filter 312, which in this example is implemented as a single circuit block 302. In some embodiments, the second down-converter 250 can be implemented as a 25% duty cycle, or four phase, passive mixer. However, the skilled person will appreciate that the use of other implementations to achieve similar functionality is contemplated, for example alternative multi-phase passive mixer schemes. The translational filter in RF is, in this example, a notch filter set to remove the frequency components over the first transmit band of frequencies, for example the desired signal to be transmitted, the TX blocker signal, from the tapped signal, whilst avoiding attenuation as much as possible of the noise, $n_{BROAD}$, in this second transmit band of frequencies. However, the filtering performed by the implementation of the feedforward circuit 230 of FIG. 4 described herein is only an example of one way of achieving the filtering properties required for filtering the tapped signal. In this respect, I and Q down-conversion provides translational filtering, but such filtering aims can effectively be delivered employing other RF techniques.

The filtered tapped signal is further filtered by the second high-pass filter 314 in order to further reduce the amplitude of the TX-blocker signal, $n_{TX}$, but at minimal expense of the noise, $n_{BROAD}$, in the second transmit band of frequencies.

The double filtered tapped signal is then amplified (Step 408) by the programmable gain amplifier 304 and then phase shifted (Step 408) by the programmable phase shifter 306 respectively in accordance with the gain setting value and the phase shift value obtained as mentioned above. In this respect, it should be appreciated that gains can be applied in differing amounts by the programmable gain amplifier 304 between the I and Q paths of the feedforward circuit 230. Similarly, phase shifts can be applied in differing amounts by the programmable phase shifter 306 between the I and Q paths of the feedforward circuit 230. The phase shift applied is intended, in this example, to condition the double filtered tapped signal so that the resulting compensation signal possesses a phase that can subsequently be phase shifted by 180°, thereby enabling effective signal component cancellation at the point of combination within the LNA 214. In this respect, the phase shift applied (before application of the 180° phase shift) is intended to compensate for the path difference between the signal path comprising the feedforward circuit 230 and the signal path through the hybrid junction module 204. The gain applied is intended, in this example, also to condition the double filtered tapped signal so that the resulting compensation signal possesses an amplitude that is substantially equal to the amplitude of the noise, $n_{BROAD}$, at the point of combination within the LNA, 214. After amplification and phase shifting, the amplified and phase shifted signal is applied to the second up-converter 254, which up-converts (Step 410) the amplified and phase shifted signal back to radio frequency. At this stage, the TX-blocker, $n_{TX}$, signal frequency components are significantly attenuated, whereas the frequency components of the noise, $n_{BROAD}$, undergoes less attenuation and so are still present for use as the compensation signal, which is subsequently applied (Step 412), in this example, to the cancellation input of the LNA 214.

At the LNA 214, in this example, the LNA 214 applies a 180° phase shift to the compensation signal and then combines the phase shifted compensation signal with the signal received from the receive port 206 for amplification, thereby attenuating the noise, $n_{BROAD}$, in the receive band of the receiver chain 106 leaked from the transmit port 208 to the receive port 206 by the hybrid junction module 204.

It should be appreciated that the feedforward circuit 230 favours propagation therethrough of signal frequencies in the second transmit band of frequencies over signal frequencies in the first transmit band of frequencies. In this respect, frequency component of signals in the second transmit band of frequencies undergo less attenuation than frequency components of signals in the first transmit band of frequencies.

The programmable gain amplifier 304 and the programmable phase shifter 306 are provided in the feedforward circuit 230 in order to allow optimisation of a transfer function in both amplitude and phase of the feedforward circuit 230 so as to optimise the compensation signal and thus subsequently maximise cancellation of the frequency components of the noise, $n_{BROAD}$, from the receive band of the receiver chain 106. The gain setting value and the phase shift value are controlled along with the settings of the signal isolation control circuit 216 in order to avoid conflict between the effects of setting the signal isolation control circuit 216, the programmable gain amplifier 304 and the programmable phase shifter 306.

In this example, the gain setting values and the phase shift setting values are determined during a factory calibration phase of manufacture based upon prior characterisation of the duplexing apparatus 108 in respect of one or more of the following: temperature, power supply voltage, CMOS process variation and antenna impedance. The prior characterisation can be achieved by applying a test tone in the receive band of frequencies at the antenna port 210 of the hybrid junction module 204 and measuring an SNR in digital baseband in response to adjustments to the gain setting value and the phase setting value, thereby enabling a look-up table of gain setting and phase setting values to be created so as to be able to configure the feedforward circuit 230 to support optimum minimisation of the frequency components of the noise, $n_{BROAD}$, based upon the measured SNR, temperature, voltage and process variation. The factory calibration process includes the determination of a default gain setting value and a default phase shift setting value.

In this example, an LNA 214 of the kind described in "Low-Noise Active Cancellation of Transmitter Leakage and Transmitter Noise in Broadband Wireless Receivers for FDD/Co-Existence" (Zhou, et al., IEEE Journal of Solid-State Circuits, vol. 49, no. 12, December 2014) is employed; the LNA of Zhou et al. comprises an adaptation of an existing internal noise cancellation capability of LNAs to provide a port operably coupled to internal noise cancellation circuitry for the internal noise so that external signals applied at the port are also subjected to a 180° phase shifting and then combined with a signal applied at the signal input of the LNA. Consequently, the LNA 214, as adapted, is capable of manipulating a signal received at the signal cancellation input (corresponding to the port of the adapted LNA of Zhou et al.) thereof by applying a 180° phase shift relative to the tapped portion of the output of the power amplifier 202 to the signal before combining it with a signal received at the signal input of the LNA 214 from the receive port 206. However, it should be appreciated that other implementations are contemplated in order to achieve a phase shift of a first signal and combination of the phase shifted first signal with a second signal to be refined. For example, the LNA 214 can be implemented simply with signal combination capabilities, i.e. without the internal phase shifting capability, or a separate signal combiner can be provided before the signal input of the LNA 214, an output of the signal combiner being coupled to the signal input of the LNA 214 and respective inputs of the signal combiner being coupled to the receive port 206 and the output of the feedforward circuit 230 in such an implementation. Depending upon the methodology for implementing the signal combination, the 180° phase shift can then be provided by an entity other than the LNA 214. In this respect, the 180° phase shift can be introduced at any point in the signal path comprising the feedforward circuit 230 between the point of tapping off the output of the power amplifier 202 to the input of the LNA 214. For example, the 180° phase shift relative to the tapped portion of the output of the power amplifier 202 can be applied in the phase shifter 306 or at the directional coupler 218, with appropriate modification.

Figure 6:
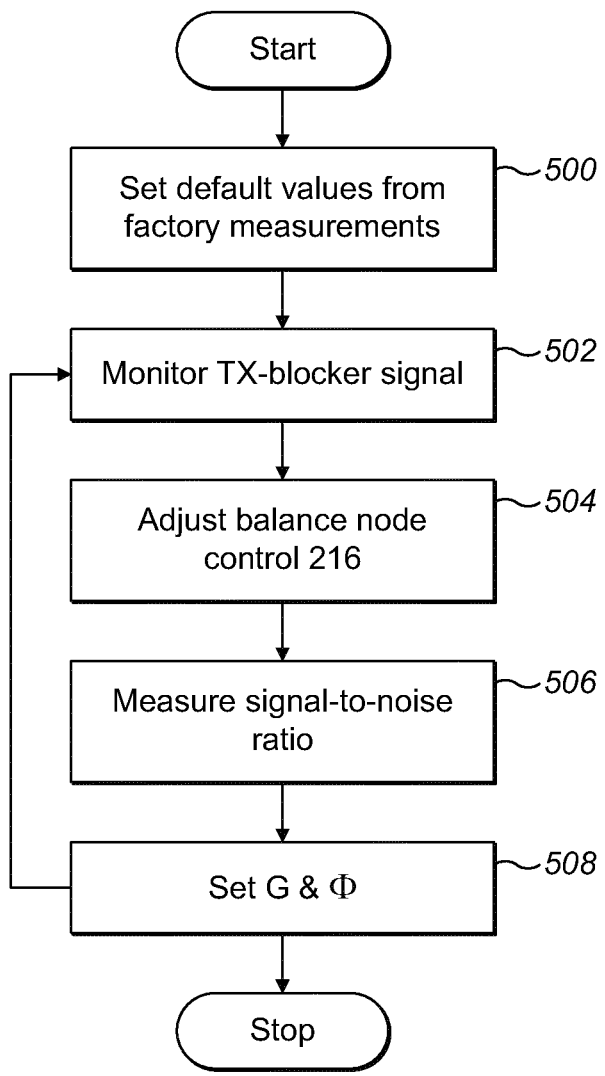
FIG. 6 is a flow diagram of a method of configuring parameters for use with the method of FIG. 5.

Referring to FIG. 6, upon powering up of the transceiver, the programmable gain amplifier 304 and the programmable phase shifter 306 are respectively set (Step 500) with the factory determined default gain setting value and the factory determined default phase shift value as an initial step. Likewise, antenna tuner, parameters of the signal isolation control circuit 216 are set to default factory calibration values.

As part of controlled operation of the hybrid junction module 204, once signal transmission by the transmitter chain 104 commences, the TX-blocker signal present at the receive side of the hybrid junction module 204 is measured (Step 502) by the baseband processing unit 258 of the receiver chain 106 and the operational parameters of the signal isolation control unit 216 are adjusted (Step 504) to minimise leakage of the TX-blocker signal in the receive band from the transmit node 208 to the receive node 206. As the control of the hybrid junction module 204 in respect of minimising leakage of the TX-blocker signal into the receive band is known, for example as set out in the two patent publications mentioned above, for the sake of clarity and conciseness of description, further details of the control of the hybrid junction module 204 in this respect will not be described further herein.

In addition to monitoring the TX-blocker signal, the SNR of the signal received by the baseband processing unit 256 is also monitored (Step 506) using the baseband processing unit 258, the measured SNR value being communicated to the controller unit 260 as a measure of signal quality. Based upon the SNR value, and in some examples temperature and/or supply voltage and/or process variation and/or antenna impedance parameters, received from the baseband processing unit 258, the controller unit 260 uses the lookup table generated in order to determine an updated gain setting value and an updated phase shift value, which are used by the control unit 260 to set (Step 508) the programmable gain amplifier 304 and the programmable phase shifter 306, respectively. The above-described method of setting the programmable gain amplifier 304 and the programmable phase shifter 306 of the feedforward circuit 230 is continually repeated in order that the feedforward circuit 230 in cooperation with the LNA 214 can mitigate, as much as possible, the effects of the presence of leaked noise, $n_{BROAD}$, generated in the transmitter chain 104.

In relation to the hybrid junction, the skilled person should appreciate that any suitable construction can be employed. For example, in the above embodiment a transformer has been described. In another embodiment, a quadrature hybrid coupler has been employed, although other variants, for example a 180° hybrid coupler, could be used. Other suitable kinds of hybrid junction can also be employed, for example a waveguide hybrid junction.

The skilled person should appreciate that the above-described implementations are merely examples of the various implementations that are conceivable within the scope of the appended claims.

The apparatus and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. A duplexing apparatus comprising:
    a hybrid junction module having an antenna port, a transmit port, a receive port and a balance port;
    a feedforward circuit configured to be responsive to a first transmit band of frequencies and a second transmit band of frequencies, the feedforward circuit having an input operably coupled to the transmit port of the hybrid junction module and having an output for outputting a compensation signal;
    wherein the hybrid junction module is configured to substantially isolate the receive port from the transmit port with respect to the first transmit band of frequencies and substantially not isolate the receive port from the transmit port with respect to the second transmit band of frequencies; and
    the feedforward circuit is configured to generate the compensation signal by propagating signal frequencies in the second transmit band over propagation of signal frequencies in the first transmit band.

2. The duplexing apparatus as claimed in claim 1, wherein the feedforward circuit comprises a filter configured for radio frequency filtering over the transmit bands of frequencies.

3. The duplexing apparatus as claimed in claim 2, wherein the filter is a translational filter configured to perform radio frequency notch filtering.

4. The duplexing apparatus as claimed claim 1, wherein the feedforward circuit comprises a down-converter for down-converting the compensation signal from radio frequency to baseband frequency.

5. The duplexing apparatus as claimed in claim 4, wherein the translational filter comprises the down-converter.

6. The duplexing apparatus as claimed in claim 5, wherein the translational filter further comprises a first high-pass filter.

7. The duplexing apparatus as claimed in claim 6, wherein the feedforward circuit further comprises:
    a second high-pass filter coupled to the first high-pass filter.

8. The duplexing apparatus as claimed in claim 7, wherein the feedforward circuit further comprises:
    a programmable gain circuit operably coupled to the second high-pass filter.

9. The duplexing apparatus as claimed in claim 8, wherein the feedforward circuit further comprises:
    a programmable phase circuit operably coupled to the second high-pass filter.

10. The duplexing apparatus as claimed in claim 9, wherein the feedforward circuit further comprises:
    an up-converter operably coupled to the programmable gain circuit or the programmable phase circuit.

11. The duplexing apparatus as claimed in claim 1, further comprising:
    a directional coupler configured to operably couple the input of the feedforward circuit to the transmit port.

12. The duplexing apparatus as claimed in claim 4, wherein the down-converter has a local oscillator input, the down-converter configured to respond to a transmit local oscillator signal applied to the local oscillator input.

13. The duplexing apparatus as claimed in claim 10, wherein the up-converter has a local oscillator input, the up-converter configured to respond to a transmit local oscillator signal applied to the local oscillator input.

14. The duplexing apparatus as claimed in claim 1, further comprising a signal combiner operably coupled to the feedforward circuit and the receive port.

15. The duplexing apparatus as claimed in claim 1, comprising:
    an amplifier having:
        a first input coupled to the receive port of the hybrid unction module; and
        a cancellation input coupled to the output of the feedforward circuit;
    wherein the amplifier is configured to apply the compensation signal to remove signals in the second transmit band of frequencies from a receive band of frequencies associated with the receive port of the hybrid junction module.

16. The duplexing apparatus as claimed in claim 8, further comprising:
   a receive baseband processing unit operably coupled to the programmable gain circuit.

17. The duplexing apparatus as claimed in claim 16, wherein the receive baseband processing unit is configured to calculate a gain setting value and communicate the gain setting value to the programmable gain circuit.

18. The duplexing apparatus as claimed in claim 17, wherein the gain setting value is based upon a calculated indication of signal quality associated with a received signal.

19. The duplexing apparatus as claimed in claim 9, further comprising:
   a receive baseband processing unit operably coupled to the programmable phase circuit.

20. The duplexing apparatus as claimed in claim 19, wherein the receive baseband processing unit is configured to calculate a phase setting value and communicate the phase setting value to the programmable phase circuit.

21. The duplexing apparatus as claimed in claim 20, wherein the phase setting value is based upon a calculated indication of signal quality associated with a received signal.

22. The duplexing apparatus as claimed in claim 15, further comprising:
   a power amplifier having an output operably coupled to the transmit port of the hybrid junction module.

23. The duplexing apparatus as claimed in claim 15, wherein the apparatus is configured to operate in accordance with frequency division duplexing communication.

24. A method of compensating for signal leakage between a transmit port and a receive port of a junction module, the method comprising:
   receiving a signal at the transmit port, the signal having frequency components in a first transmit band of frequencies and further frequency components in a second transmit band of frequencies;
   isolating, at the junction module substantially the receive port from the transmit port with respect to the first transmit band of frequencies;
   substantially not isolating, at the junction module, the receive port from the transmit port with respect to the second transmit band of frequencies;
   tapping a portion of the signal and feeding forward the further frequency components of the portion of the signal in the second transmit band of frequencies in favor of the frequency components of the portion of the signal in the first transmit band of frequencies; and
   outputting as a compensation signal the portion of the signal that remains after the feeding forward.

* * * * *

UNITED STATES PATENT AND TRADEMARK OFFICE
CERTIFICATE OF CORRECTION

PATENT NO. : 10,659,098 B2
APPLICATION NO. : 16/303314
DATED : May 19, 2020
INVENTOR(S) : Michael Joseph McCullagh Page 1 of 1

It is certified that error appears in the above-identified patent and that said Letters Patent is hereby corrected as shown below:

In the Claims

Claim 15, Column 14, Line 63, "unction module; and" should read --junction module; and--.

Signed and Sealed this
Fourteenth Day of July, 2020

Andrei Iancu
*Director of the United States Patent and Trademark Office*